United States Patent [19]
Hadiken

[11] Patent Number: 6,061,956
[45] Date of Patent: May 16, 2000

[54] DRYING SAND TO PREVENT FREEZING WITHOUT THE USE OF SALT

[76] Inventor: Lawrence Hadiken, Box 36, Group 355, R.R.#1, Winnipeg, Manitoba, Canada, R3C 2E7

[21] Appl. No.: 09/173,026

[22] Filed: Oct. 15, 1998

[51] Int. Cl.⁷ .......................... A01B 79/00; A01B 79/02; B60B 39/04; C04B 14/06; A01C 1/00
[52] U.S. Cl. .......................... 47/58.1; 106/812; 164/456; 291/38
[58] Field of Search ............................... 47/58.1; 106/812; 164/456; 291/38

[56] References Cited

PUBLICATIONS

Schnoor et al., Phytoremediation of Organic and Nutrient Contaminants, Enviromental Science and Technology, vol. 29, No. 7, 318A–323A, 1995.

*Primary Examiner*—Gary Benzion
*Assistant Examiner*—Anne Marie Grünberg
*Attorney, Agent, or Firm*—Adrian D. Battison; Murry E. Thrift

[57] ABSTRACT

A method for supplying dry sand for spreading on road surfaces in freezing temperatures in a condition in which the sand remains fluid in freezing temperatures without the addition of salt includes the steps of drying the sand by providing a naturally occurring bed of the sand having an upper surface of the bed exposed to sunlight; planting on the upper surface a covering crop of a type such as alfalfa having deep roots which extend through the whole bed up to thirty feet deep in search of a water table below the bed and growing the crop for a period of time sufficient to allow the roots to penetrate the bed and to extract moisture from the bed to dry the sand in the bed. The dry sand is extracted from the bed and stored temporarily in a closed storage which prevents the re-introduction of moisture for subsequent use on road surfaces without the necessity of salt to keep the sand fluid for spreading.

8 Claims, 1 Drawing Sheet

DRYING SAND TO PREVENT FREEZING WITHOUT THE USE OF SALT

This invention relates to method for supplying sand in a condition which remains fluid in freezing temperatures without the addition of salt and particularly to a method of drying the sand to extract sufficient moisture to prevent the moisture when frozen from interfering with the flow of the sand.

BACKGROUND OF THE INVENTION

It is well established that sand is spread on road surfaces in winter conditions to improve traction where traction might be reduced by the presence of snow and ice.

In some cases salt alone is spread on the road surface in order to melt sheet ice. However the damaging effects of salt are well known in that the chloride ions generate significant levels of corrosion in the concrete and the materials of the roadway and in the vehicles passing over the roadway. In addition the dumping of salt from the roadway into the drains and sewers can cause the salt to enter waterways with further damaging effects to the environment. It is well known therefore that the use of salt is to be avoided wherever possible.

In freezing conditions, moist or wet sand freezes into a solid block so that it is no longer fluid and possible to spread across the roadway. In such freezing conditions, therefore, generally the sand has mixed with it a certain level of salt which is sufficient to prevent the moisture in the sand from freezing so that the sand remains moist but free to be spread. It is also known that dry sand containing little or no moisture remains fluid even when frozen since there is no moisture to solidify and bind the sand particles.

It is well known therefore that if the sand prepared to be spread upon the roadway can be dried, it will remain fluid even in the coldest conditions thus avoiding the necessity for the addition of salt.

Attempts have been made therefore to dry the sand using various techniques generally requiring the application of heat. Asphalt plants can be used for the application of the necessary level of heat to dry the sand but this requires a cost of the heat which is sufficiently high so that the process is not economically viable. It will be appreciated that the winter requirements of a city having a population of the order of 500,000 is of the order of 150,000 tons of sand for the city streets so that the costs of drying the quantity of sand in this amount would be very significant.

Up till now, therefore, there has no viable technique for drying the sand to thus avoid the necessity for the addition of salt.

SUMMARY OF THE INVENTION

It is one object of the present invention to provide an improved method of providing sand in a fluid condition when in freezing temperatures without the necessity for salt.

According to the invention, therefore, there is provided a method for supplying sand in a condition which remains fluid in freezing temperatures without the addition of salt comprising:

providing a bed of the sand having an upper surface of the bed exposed to sunlight and a volume of the bed underneath the upper surface;

planting on the upper surface for growing in the bed a covering crop of a type having characteristics such that roots of the crop extend through the volume of the bed in search of water in the bed and below the bed;

growing the crop for a period of time sufficient to allow the roots to penetrate the bed and to extract moisture from the bed to dry the sand in the bed;

and extracting the dry sand from the bed.

Preferably the crop is alfalfa although other crops which have the same type of deep root system which can go down up to 30 feet could also be used. The roots of a plant of this type are very fine filaments so that the sand when extracted is not contaminated with thick fibrous elements such as tree roots. The roots pass through the sand bed in search of a water table below the sand bed and in their search act to dry the sand sufficient to be free from enough moisture to interfere with fluidity when frozen.

Alfalfa as the selected crop has the advantage that it can be independently harvested to cover the costs of planting. Alfalfa is a perennial so that it continues to grow each season for further harvesting.

The crop should be grown for at least two years so that the root structure is sufficient to cause the necessary drying effect to the required depth. However the crop can be left in place longer if the sand is not yet required to be extracted.

Preferably the bed is arranged on top of a water table at a depth accessible by the roots below the bed.

Preferably the bed is a naturally existing bed since this avoids extra handling of the large quantities of sand concerned. Such a natural bed generally will have a depth of at least five feet and generally much more such as of the order of 30 feet so as to provide commercial quantities of sand.

Preferably the upper surface of the bed and the crop are uncovered and exposed to the elements. Thus no extra covering is necessary to allow the sunlight to reach the crop. Any rain will generally penetrate only a few inches and will be dried off naturally. Covering may only be necessary when the sand is actually being extracted so that It is no longer protected by the overlying stand of the crop to prevent short term rain fall from entering the sand in the time after it is exposed and before it is transported away for temporary storage.

Preferably the sand is stored temporarily in a substantially closed container after extraction and prior to use in a manner which prevents the re-introduction of moisture.

Preferably the container includes a hopper bottom discharge loading system for loading trucks from the sand discharged from the container. In this way, the container can be kept closed as the sand is extracted.

Preferably the container includes an air injection system for injecting drying air to maintain the dryness of the sand.

After storage, the sand is transported and spread over road surfaces in freezing weather.

BRIEF DESCRIPTION OF THE DRAWINGS

One embodiment of the invention will now be described in conjunction with the accompanying drawings in which.

DETAILED DESCRIPTION

Figure 1:
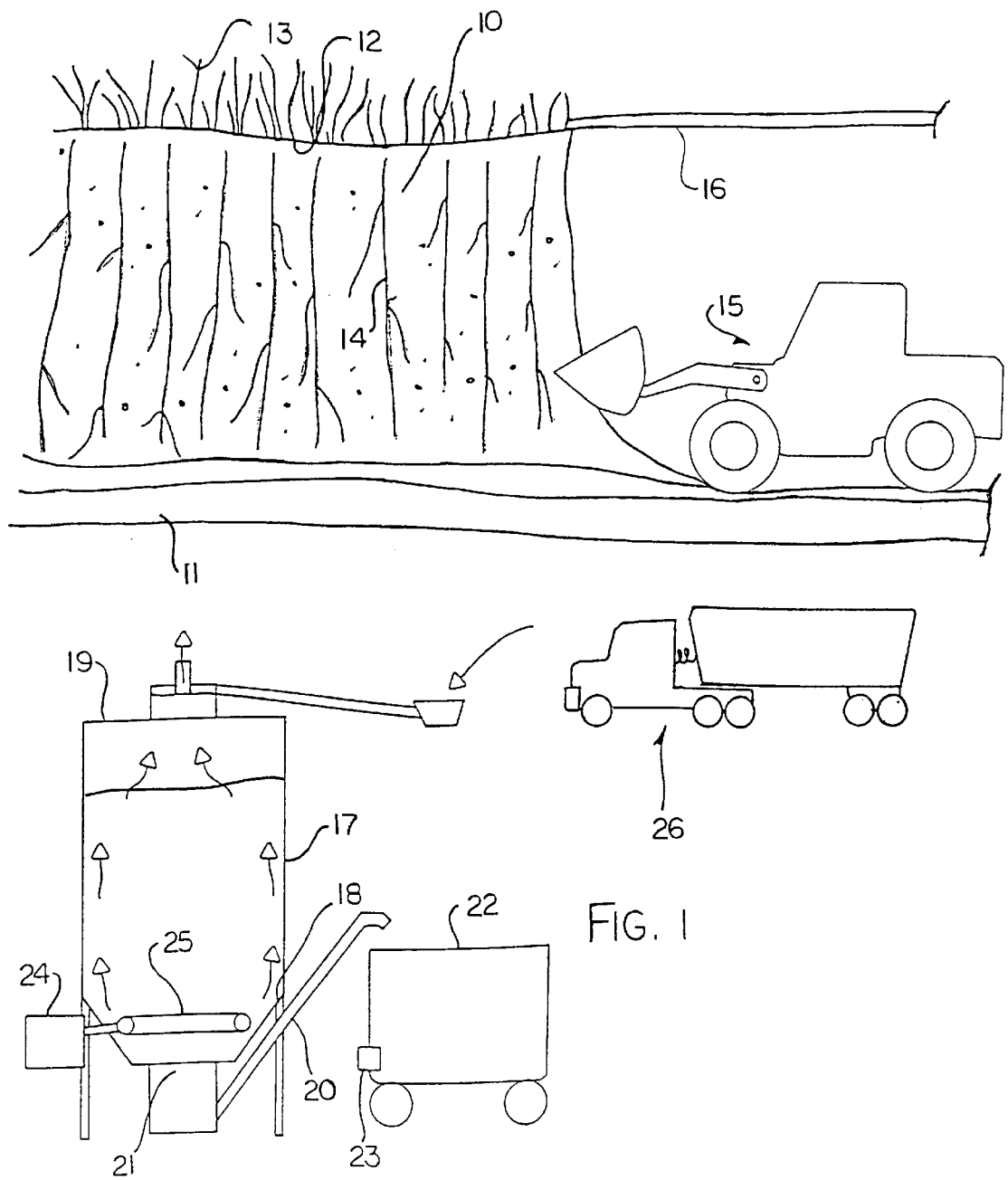
FIG. 1 is a schematic illustration of a method according to the present invention.

In FIG. 1 is shown a naturally occurring bed 10 of sand to be extracted. Such sand beds are readily available in many locations and have varying depths depending upon local conditions. The depth of such a bed would generally be significantly greater than five feet and in many cases up to thirty feet since these depths provide the necessary commercially feasible quantities of sand. Underneath the sand bed is a water table schematically indicated at 11.

The method of the present invention involves planting on the naturally existing sand bed at an upper surface 12 a standing crop 13 of alfalfa or similar crop which has deep root system filaments 14. The upper surface of the bed of sand can be suitable levelled and managed to assist in the planting of the crop from seed.

In order to assist growth of the initially seeded crop on top of the sand bed, in some cases it may be necessary to lay down a thin layer of the order of 2 inches of a nutrient rich soil mix and fertilizer. This can be removed in the final extraction of the sand. The details of the soil and nutrients will be well known to one skilled in the art.

The crop is left standing for a period of time generally more than two years so that the root system can develop sufficiently to extend through the sand bed to the water table to effect extraction of water from the water table for supporting the growth of the crop. During the years that the crop is growing, the crop can be harvested for a cash crop to cover the costs involved.

In general the natural bed of this type will have a size which is many acres so that the crop can be planted on all of the bed if necessary or in only parts of the bed where the drying action is required. The crop is planted in years ahead of the intended extraction time to ensure that the drying effect can be obtained before it is necessary to effect the extraction for use of the sand.

During extraction when an edge of the bed is exposed as the bed is cut away by conventional lifting equipment indicated at 15, it may be necessary to provide a cover 16 so that the sand remains dried even when it is exposed to the elements.

The sand when extracted is loaded in suitable transport trucks 26 and transported to closed containers 17 at required locations for use.

The container 17 is a closed container with a hopper bottom 18 and a roof cover 19 so that the sand remains dry without the possibility for entry of damp air or of rain. A conveyor loading system is provided to allow the material from the truck to be loaded while remaining in dry condition. A discharge loading system generally indicated at 20 is located at a discharge spout 21 of the hopper bottom allowing the sand to be lifted for loading into spreader trucks 22 having suitable spreading system 23 for spreading the sand over the road surface.

In some cases it may be necessary or desirable to assist in maintaining the level of dryness of the sand by injecting air from a blower 24 through a ring of nozzles 25 adjacent the bottom of the hopper bottom 18. This air is not intended to dry the sand from wet but simply merely to keep any entering moisture extracted from the sand so that the moisture content does not increase during storage to a level where fluidity may be comprised. The air is discharged through a roof vent at the loading opening. The loading opening and the vent being arranged to allow entry of the material, escape of the air while preventing entry of moisture.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A method for supplying sand comprising:

providing a bed of the sand having an upper surface of the bed exposed to sunlight and a volume of the bed underneath the upper surface;

planting on the upper surface for growing in the bed a covering crop of a type having characteristics such that roots of the crop extend through the volume of the bed in search of water in the bed and below the bed;

growing the crop for a period of time sufficient to allow the roots to penetrate the bed and to extract moisture from the bed to dry the sand in the bed;

extracting the dry sand from the bed;

maintaining the sand in a condition which prevents the reintroduction of moisture such that it remains dry;

and supplying the dry sand in freezing weather conditions wherein the sand remains fluid in freezing temperature without addition of salt thereto.

2. The method according to claim 1 wherein the covering crop is alfalfa.

3. The method according to claim 1 wherein the bed is arranged on top of a water table which is at a depth from the upper surface of the bed so as to be accessible by the roots.

4. The method according to claim 1 wherein the upper surface of the bed and the covering crop are uncovered and exposed to the elements.

5. A method for applying sand to a road surface comprising:

providing a bed of the sand having an upper surface of the bed exposed to sunlight and a volume of the bed underneath the upper surface;

planting on the upper surface for growing in the bed a covering crop of a type having characteristics such that roots of the crop extend through the volume of the bed in search of water in the bed and below the bed;

growing the crop for a period of time sufficient to allow the roots to penetrate the bed and to extract moisture from the bed to dry the sand in the bed;

extracting the dry sand from the bed;

storing the sand in a container which prevents the reintroduction of moisture such that it remains dry;

and applying the dry sand in freezing weather conditions to the road surface wherein the said remains fluid in freezing temperatures without addition of salt thereto.

6. The method according to claim 5 wherein the crop is alfalfa.

7. The method according to claim 5 wherein the bed is arranged on top of a water table such tat the water table is accessible by the plant roots.

8. The method according to claim 5 wherein the upper surface of the bed and the crop are uncovered and exposed to the elements.

* * * * *